United States Patent
So et al.

(10) Patent No.: US 8,316,360 B2
(45) Date of Patent: Nov. 20, 2012

(54) METHODS AND APPARATUS TO OPTIMIZE THE PARALLEL EXECUTION OF SOFTWARE PROCESSES

(75) Inventors: Byoungro So, Santa Clara, CA (US); Anwar M. Ghuloum, Menlo Park, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1261 days.

(21) Appl. No.: 11/537,585

(22) Filed: Sep. 29, 2006

(65) Prior Publication Data

US 2008/0127145 A1 May 29, 2008

(51) Int. Cl.
  *G06F 9/45* (2006.01)
(52) U.S. Cl. .......................................... 717/159
(58) Field of Classification Search .................. 717/140, 717/149, 119, 156, 159–161; 713/375; 718/100, 718/102, 105, 106; 712/10, 22, 220; 709/201; 345/426
See application file for complete search history.

(56) References Cited

U.S. PATENT DOCUMENTS

| | | | | |
|---|---|---|---|---|
| 4,920,487 A | * | 4/1990 | Baffes | 718/105 |
| 6,106,575 A | * | 8/2000 | Hardwick | 717/119 |
| 6,567,084 B1 | * | 5/2003 | Mang et al. | 345/426 |
| 7,673,295 B1 | * | 3/2010 | Lin | 717/156 |
| 2004/0193841 A1 | * | 9/2004 | Nakanishi | 712/10 |
| 2006/0112377 A1 | * | 5/2006 | Nacul et al. | 717/140 |
| 2007/0083730 A1 | * | 4/2007 | Vorbach et al. | 712/10 |

OTHER PUBLICATIONS

Han et al, "Eliminating Barrier Synchronization for Compiler-Parallelized Codes in Software DSMs", IJPP vol. 26, No. 5, 1998 pp. 591-612.*
Jim Demmel, Kathy Yelick, Alan Edelman, "Tricks with Trees", downloaded from http://72.14.203.104/search?q=cache:7xHegQRIfAUJ:www.cs.ucsb.edu/~gilbert/cs240aWin2006/lectures/YelickDemmelTrees.ppt+Tricks+with+Trees+Jim+Demmel+Kathy+Yelick,+Alan+Edelman&hl=en&gl=us&ct=clnk&cd=1, May 24, 2006, 12 pages.
Byoungro So, Anwar M. Ghuloum, and Youfeng Wu, "Optimizing Data Parallel Operations on Many-Core Platforms", from "Software Tools for Multi-Core Systems" workshop, New York, NY, Mar. 26, 2006, 5 pages.

* cited by examiner

*Primary Examiner* — Tuan A Vu
(74) *Attorney, Agent, or Firm* — Hanley, Flight & Zimmerman, LLC (57) ABSTRACT

Methods and apparatus to optimize the parallel execution of software processes are disclosed. An example method includes receiving a first software process that processes a set of data, locating a first primitive in the first software process, and decomposing the first primitive into a first set of one or more sub-primitives. The example methods and apparatus additionally perform static fusion and dynamic fusion to optimize software processes for execution in parallel processing systems.

15 Claims, 8 Drawing Sheets

METHODS AND APPARATUS TO OPTIMIZE THE PARALLEL EXECUTION OF SOFTWARE PROCESSES

FIELD OF THE DISCLOSURE

This disclosure relates generally to software processes and, more particularly, to parallel execution of software processes.

BACKGROUND

The desire to increase the execution speed of computer instructions has led to the implementation of parallel processing systems. Parallel processing systems include multiple processing units and/or multiple cores on each processing unit. Each processing core can execute computer instructions simultaneously. In addition, processes have been divided into multiple threads such that multiple threads can be executed simultaneously by separate processing units and/or cores.

Data parallelism refers to the performance of simultaneous operations (e.g., executing multiple threads simultaneously) across large sets of data (e.g., arrays, matrices, vectors, sets, trees, etc.). Example data parallel operations include element-wise operations, prefix-sum operations, reduction operations, permutation operations, etc.

Some data parallel operations require that data be operated in a specific order. For example, when a second operation uses the results of a first operation, the first operation must be completed before the second operation to ensure that the result of the first operation is available for use by the second operation. The ordering of data parallel operations has typically been handled using barriers. In such an arrangement, when an executing thread reaches a barrier instruction, the executing thread stops and waits for all other threads to complete before proceeding with its execution. One disadvantage of the use of barriers is that even if an executing thread does not require the result of all other threads to continue executing (i.e., it is not dependent on the other threads), the executing thread must wait at the barrier until all other threads have completed.

DETAILED DESCRIPTION

Figure 1:
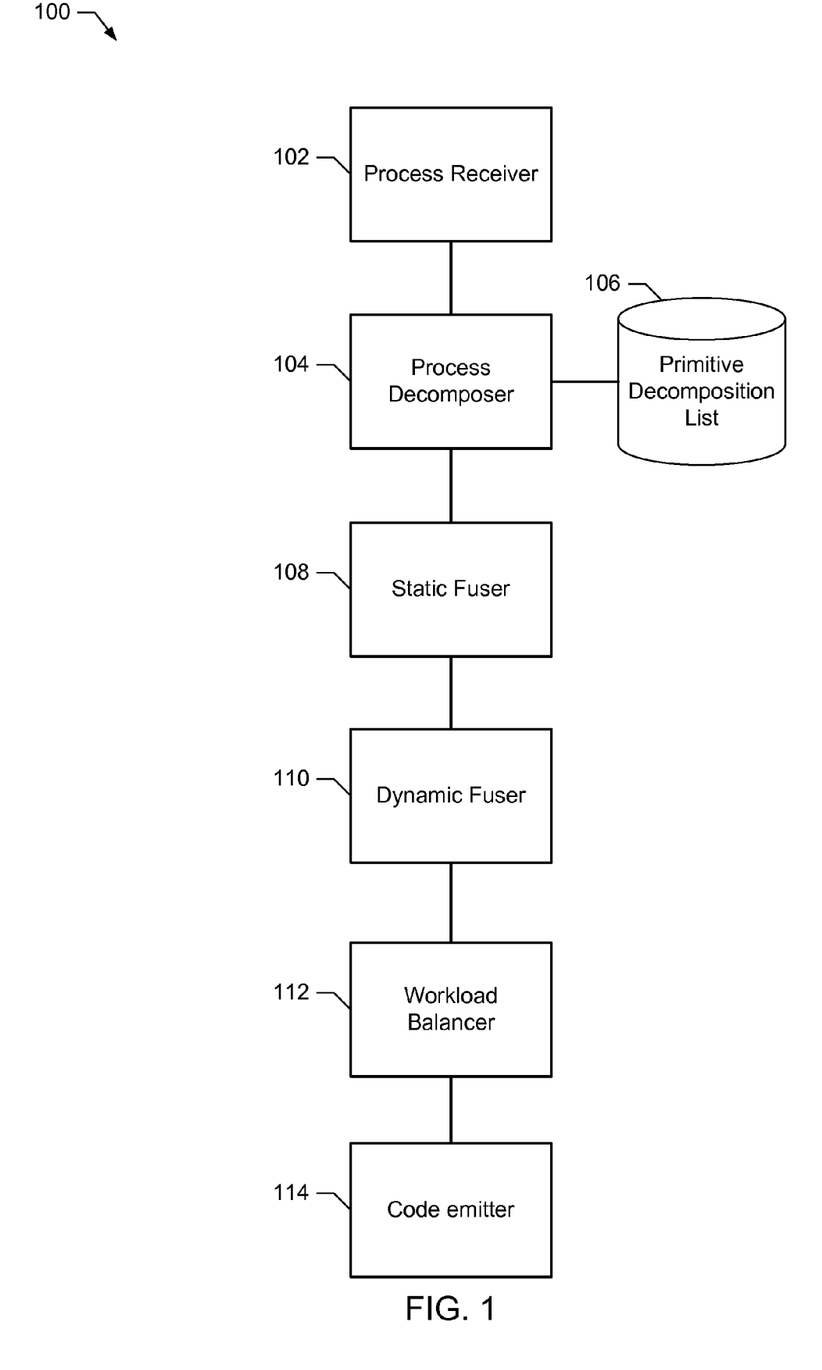
FIG. 1 is a block diagram of an example system 100 for optimizing the parallel execution of software processes.

FIG. 1 is a block diagram of an example system 100 for optimizing the parallel execution of software processes. In one implementation, the methods and apparatus disclosed herein may be used as part of an implementation of a software compiler. In general, the example methods and apparatus described herein may be used to decompose a software process (i.e., a primitive) that operates on a set of data into the basic elements (i.e., the sub-primitives) of that software process. The example methods and apparatus may also be used to arrange the execution of the sub-primitives to optimize the software process for parallel execution by two or more threads. As described below, for example, a set of data operated on by a software process may be divided into n chunks of data, where there are n threads. Another process having similarly sized data may be fused with the n chunks to utilize the same n threads. The results of the n individual computations are combined using a tree to determine the result of the software process. Though the use of techniques that order the execution of a process such that each thread only delays execution until the required results of other threads are received, the example methods and apparatus described herein reduce the need for barriers that stop execution of all threads. The disclosed methods and apparatus may be used to optimize the performance of computer instructions executing on multi-processing computer systems (e.g., computers with multiple possessors and/or multiple-core processor(s)).

The example system 100 includes a process receiver 102, a process decomposer 104, a primitive decomposition list 106, a static fuser 108, a dynamic fuser 110, a workload balancer 112, and a code emitter 114. Flowcharts of example processes for implementing aspects of the example system 100 are illustrated in FIGS. 2-4 and 6.

In the illustrated example, the process receiver 102 receives a software process. A software process may be any set of computer instructions or representation of computer instructions that operates on a set of data. For example, a software process may be an operation, a function, a method, a computer program, an algorithm, a software flow diagram, a software flow graph, or any other representation of computer instructions. The software process of the illustrated example is a software process that is capable of parallel execution. For example, the software process may operate on data that may be separated into blocks that can be operated on in parallel (e.g., multiple parallel threads executing in parallel on a multi-core or multi-processor system). The example process receiver 102 may receive the instructions from an available computer memory (e.g., local memory 814, random access memory 818, read only memory 820, mass storage 830 of FIG. 8), an input device (e.g., input devices 826 or any other input via interface 824 of FIG. 4), or any other source of software processes. In the illustrated example, the process receiver 102 transmits the received process to the process decomposer 104.

The process decomposer 104 of the illustrated example receives a software process from the process receiver 102 and decomposes the primitives (e.g., software operations such as element-wise computation, a reduction, a prefix-sum, a data movement computation, a permutation, sparse matrix vector multiplication, etc.) of the software process into the basic elements of the primitives (called sub-primitives). As explained below in conjunction with FIG. 3, the process decomposer 104 replaces the intermediate representation for the primitives with the determined sub-primitives.

For example, if the received process is a process to compute the element-wise addition A+B+C+D (where A, B, C, and D are matrices), the process decomposer 104 can decompose this process into a first sub-primitive (e.g., computation of A+B and C+D) and a second sub-primitive (e.g., the addition of the results of the first sub-primitive computations).

The first sub-primitive of the forgoing example is known as a local sub-primitive because it does not require any synchronization between computations. In other words, the computations of A+B and C+D do not need to wait for other computations to complete before being performed. The second sub-primitive is known as a global sub-primitive because it must be synchronized with the completion of the first (local) sub-primitive. In other words, the global sub-primitive must wait for the completion of the local sub-primitive because it is dependent on the result of those computations (i.e., the addition of the results of the calculations in the first sub-primitive cannot be completed until those calculation themselves are completed).

The process decomposer 104 of the illustrated example is connected to the primitive decomposition list 106. The example process decomposer 104 retrieves information from the primitive decomposition list 106 that indicates how primitives should be decomposed. For example, the primitive decomposition list 106 may indicate that an element-wise operation will decompose into a local sub-primitive, while a reduction operation or a prefix-sum operation will decompose into a local sub-primitive and a global sub-primitive. Alternatively, the example process decomposer 104 may use any other method for determining the sub-primitives associated with a process.

After the example process decomposer 104 determines the sub-primitives associated with the process, the process decomposer 104 transmits the updated sub-primitive information to the static fuser 108. For example, the sub-primitives may be represented by intermediate representation instructions and the updated intermediate representation instructions may be transmitted to the static fuser 108. The process decomposer 104 of the illustrated example includes data and control dependence information associated with each of the sub-primitives. In other words, the process decomposer 104 provides information that indicates the order in which data is handled by the sub-primitives. For example, the data and control dependence information may indicate that a global sub-primitive operation follows a local sub-primitive operation. For example, data and control dependence information may be represented by edges in a dependence graph connecting the local sub-primitive to the global sub-primitive.

Figure 7:
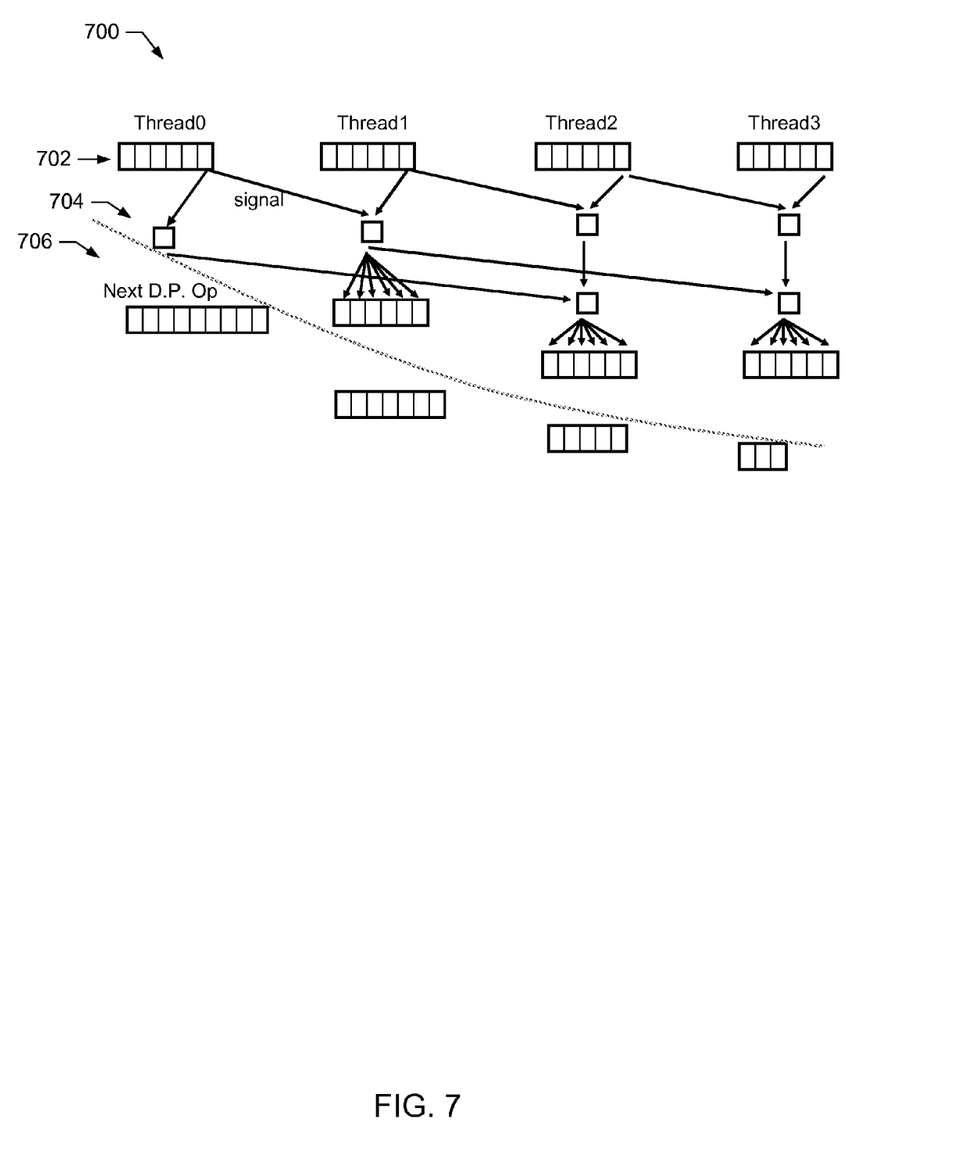
FIG. 7 is an illustration of the execution of an example process that has been dynamically fused.

As noted above, the example primitive decomposition list 106 includes a set of primitives and associated sub-primitive decompositions. For example, the primitive decomposition list 106 may indicate that the prefix-sum operation primitive should be decomposed into: a local sub-primitive (e.g., the data should be divided into n parts where there are n processing units and each of the n parts should be serially added) and a global sub-primitive (e.g., the results of the n parts should be combined pair-wise as illustrated in FIG. 7). The example primitive decomposition list 106 may be stored in a database, a file stored in available memory, a list associated with or embedded in a software compiler, etc.

Figure 4:
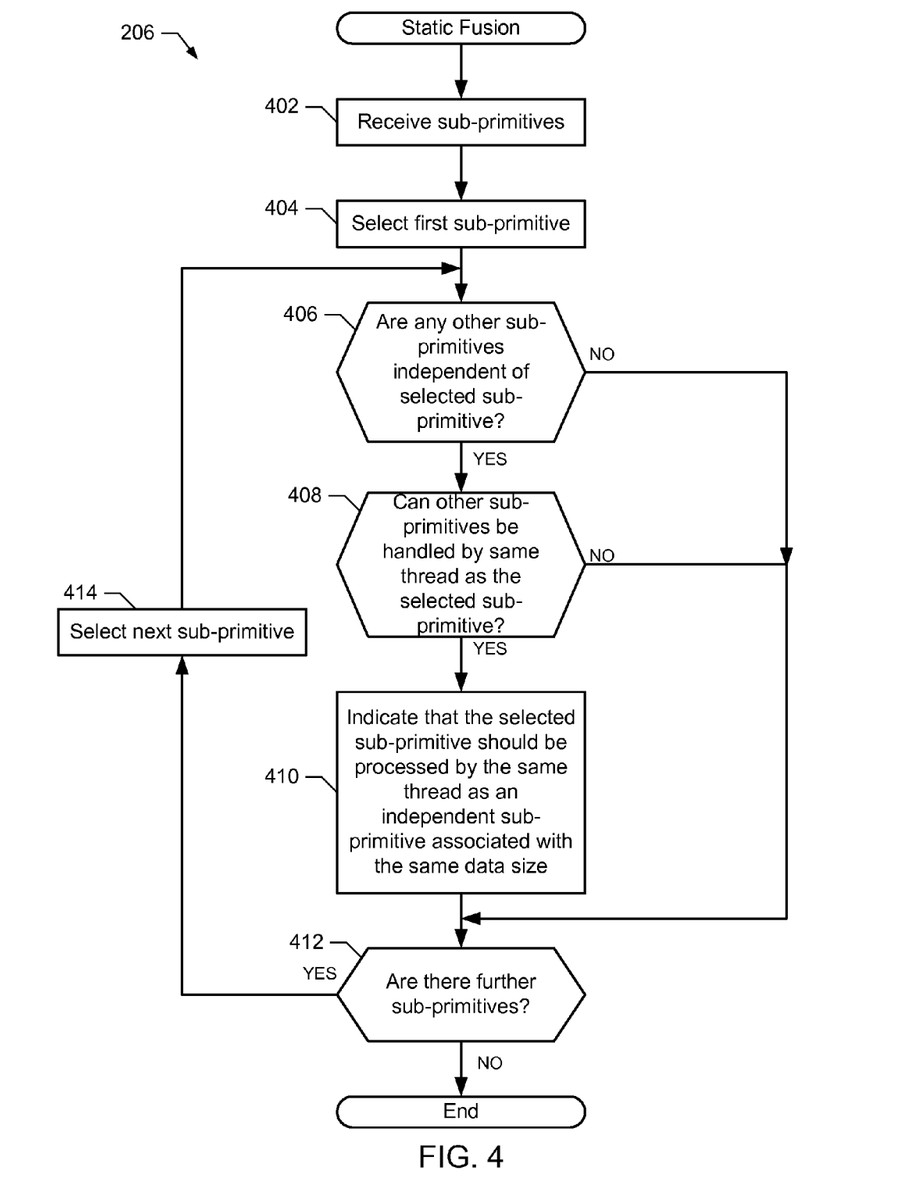
FIG. 4 is a flowchart representative of an example process that may be used to perform static fusion.

The example static fuser 108 merges, or fuses, sub-primitives that do not require synchronization and have similar characteristics for execution using a single task or a set of tasks. In other words, the static fuser 108 designates that an operation that would typically be processed by two tasks or sets of tasks should be processed by a single task. Fusing sub-primitives reduces the overhead associated with barrier synchronization and the overhead associated with creating tasks by eliminating repetitive task creation. For example, the static fuser 108 may fuse two sub-primitives that have no dependence among tasks. The two fused sub-primitives are then computed by a single task. Statically fusing two sub-primitives eliminates overhead associated with the creation of tasks. A flowchart of an example method for implementing the static fuser 108 is illustrated in FIG. 4. The static fuser 108 of the illustrated example transmits the sub-primitives following static fusion to the dynamic fuser 110.

Figure 6:
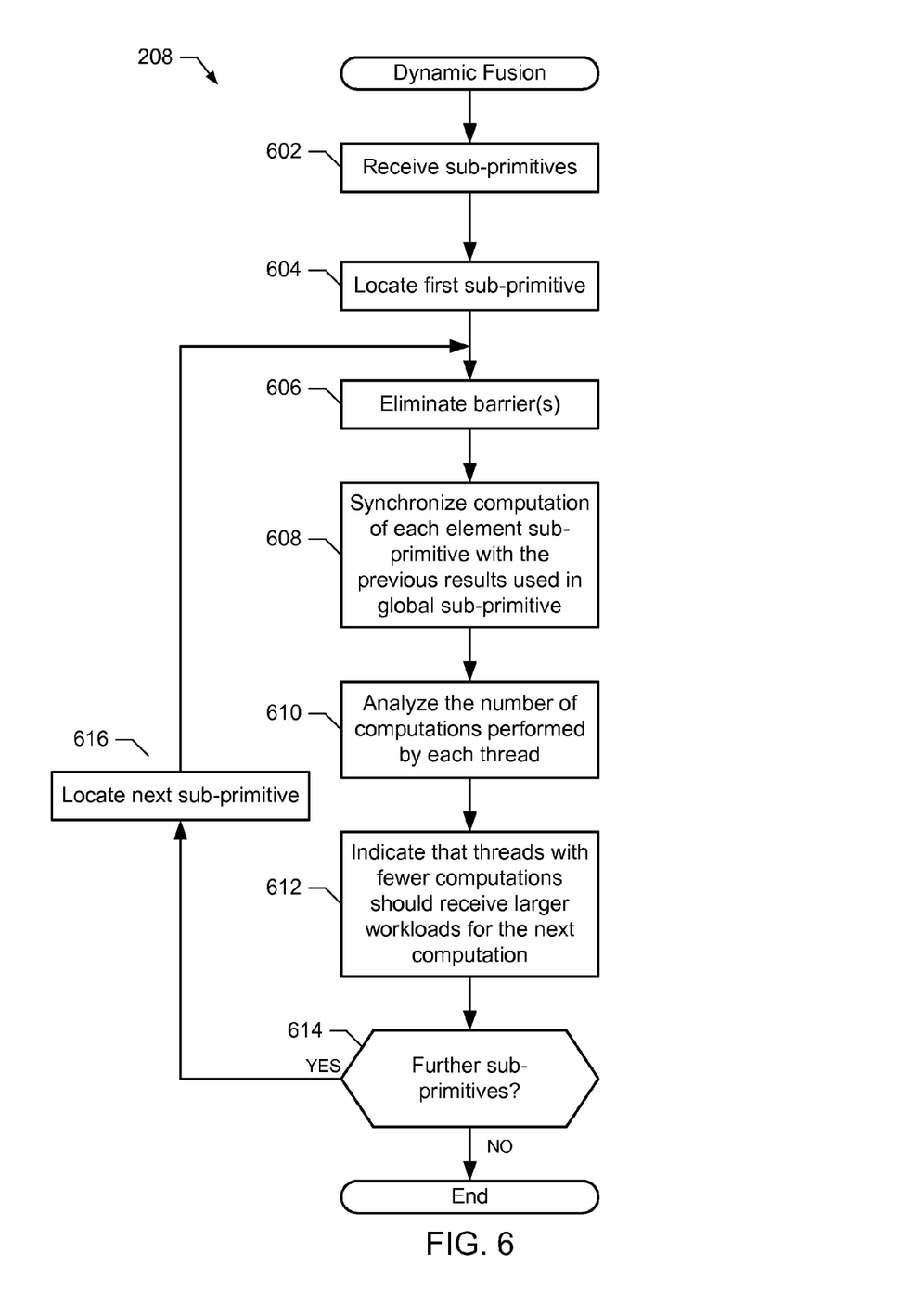
FIG. 6 is a flowchart representative of an example process that may be used to perform dynamic fusion.

The dynamic fuser 110 of the illustrated example eliminates execution barriers for sub-primitives that depend on the result of previous operations. For example, when the dynamic fuser 110 receives sub-primitives, the dynamic fuser 110 removes the remaining execution barrier after static fusion and replaces it by synchronizing the individual threads with only the previous computations that are required by the thread. Dynamic fusion eliminates the need for a barrier that stops the execution of all threads. By delaying only threads that are awaiting the results of previous computations, the remaining threads can continue to perform computations. A flowchart of an example method for implementing the dynamic fuser 110 is illustrated in FIG. 6. The dynamic fuser 110 of the illustrated example transmits the statically and dynamically fused sub-primitives to the workload balancer 112.

As described in further detail herein, dynamic fusion results in imbalanced distribution of work for executing threads. In other words, some threads may need to perform more work to execute a process. The example workload balancer 112 balances the work performed by each thread by scheduling more work for threads that will complete execution of the process earlier. For example, if a given process requires a first thread to perform one operation and a second thread to perform two operations, the workload balancer 112 will schedule the first process to execute a more complex workload (e.g., an operation that is performed on a matrix that is larger) on the first thread and a less complex workload on the second thread. Workload balancing is explained in further detail in conjunction with FIG. 7. After balancing the workload, the sub-primitives are transmitted to the code emitter 114.

The code emitter 114 of the illustrated example receives the fused and balanced sub-primitives and outputs instructions associated with the sub-primitives. For example, if the sub-primitives are described by intermediate representation instructions, the code emitter 114 may compile and output machine code instructions for the sub-primitives. Alternatively, the code emitter 114 may output any other type of desired code (e.g., high-level instructions, intermediate representation instructions, assembly instructions, etc.). In addition, the code emitter 114 may not be necessary where the representation of the sub-primitives is already of the desired type.

Having described the architecture of an example system that may be used to optimize the parallel execution of software processes, various processes are described in FIGS. 2, 3, 4, and 6. Although the following discloses example processes, it should be noted that these processes may be implemented in any suitable manner. For example, the processes may be implemented using, among other components, software, machine readable code/instructions, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.), exclusively in software, exclusively in machine readable code/instructions, exclusively in firmware, or some combination of hardware, firmware, and/or software. Additionally, some portions of the process may be carried out manually.

While the following processes are described in conjunction with the hardware of FIG. 1, the blocks/processes need not be associated with the hardware of FIG. 1 in the manner described. That is, different hardware blocks may perform different steps than those described. In addition, any hardware capable of performing the described processes may be used.

Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes.

Figure 2:
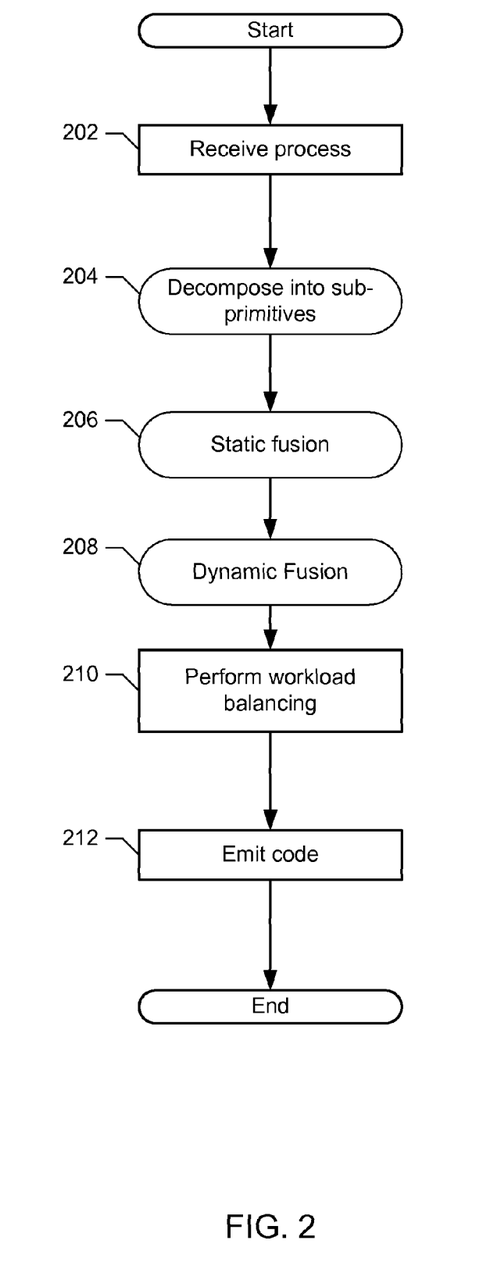
FIG. 2 is a flowchart representative of an example process that may be performed to implement the example system of FIG. 1.

FIG. 2 is a flowchart representative of an example process that may be performed to implement the example system 100 of FIG. 1.

The example process 204 begins when the process receiver 102 receives an input process (block 202). For example, the process receiver 102 may receive a process that performs an element-wise multiply of A×B and then performs a prefix-sum of the result (i.e., the process determines the dot-product of A and B). The process decomposer 104 receives the process from the process receiver 102 and decomposes the primitives of the process into sub-primitives (block 204). For example, the element-wise multiply can be decomposed into a local sub-primitive (e.g., break the data into n/p chunks and then do element-wise multiply, where n is the size of the data and p is the number of processing units) and the prefix-sum can be decomposed into a local sub-primitive (e.g., break the data into n/p chunks and then do element-wise sum, where n is the size of the data and p is the number of processing units) and a global sub-primitive (e.g., add the results from the p computations to obtain the final result). An example method for decomposing a process into sub-primitives is illustrated in the flowchart of FIG. 3.

The static fuser 108 receives the sub-primitives and performs static fusion to optimize parallel execution of the process (block 206). For example, in the dot product example from above, the local sub-primitive from the element-wise multiply and the local sub-primitive from the prefix-sum have the same data size so the same p threads can be used to compute both. Then, the dynamic fuser 110 receives the sub-primitives and performs dynamic fusion on the sub-primitives (block 208). For example, the global sub-primitive of the dot product example combines the results of the p threads from the local sub-primitive to compute the result. The addition of the results can be dynamically fused to use pair-wise computations where the barriers are removed. The barriers are replaced by synchronization in which a thread is only delayed when its next computation requires a value that has not yet been computed. In other words, individual threads can continue performing computations while other threads are awaiting results. Dynamic fusion may include workload balancing by the workload balancer 112 (block 210). For example, a pair-wise computation of the global sub-primitive will not require the use of all threads for all computations. Accordingly, the next data parallel process (e.g., the data parallel process that follows the dot product calculation) should be scheduled such that larger workloads are assigned to threads that will be idle. Thus, the idle threads can get started on the next data parallel process.

After static fusion and dynamic fusion are performed by the static fuser 108 and the dynamic fuser 110, the processor 114 emits code associated with the process according to the sub-primitives (block 212).

Figure 3:
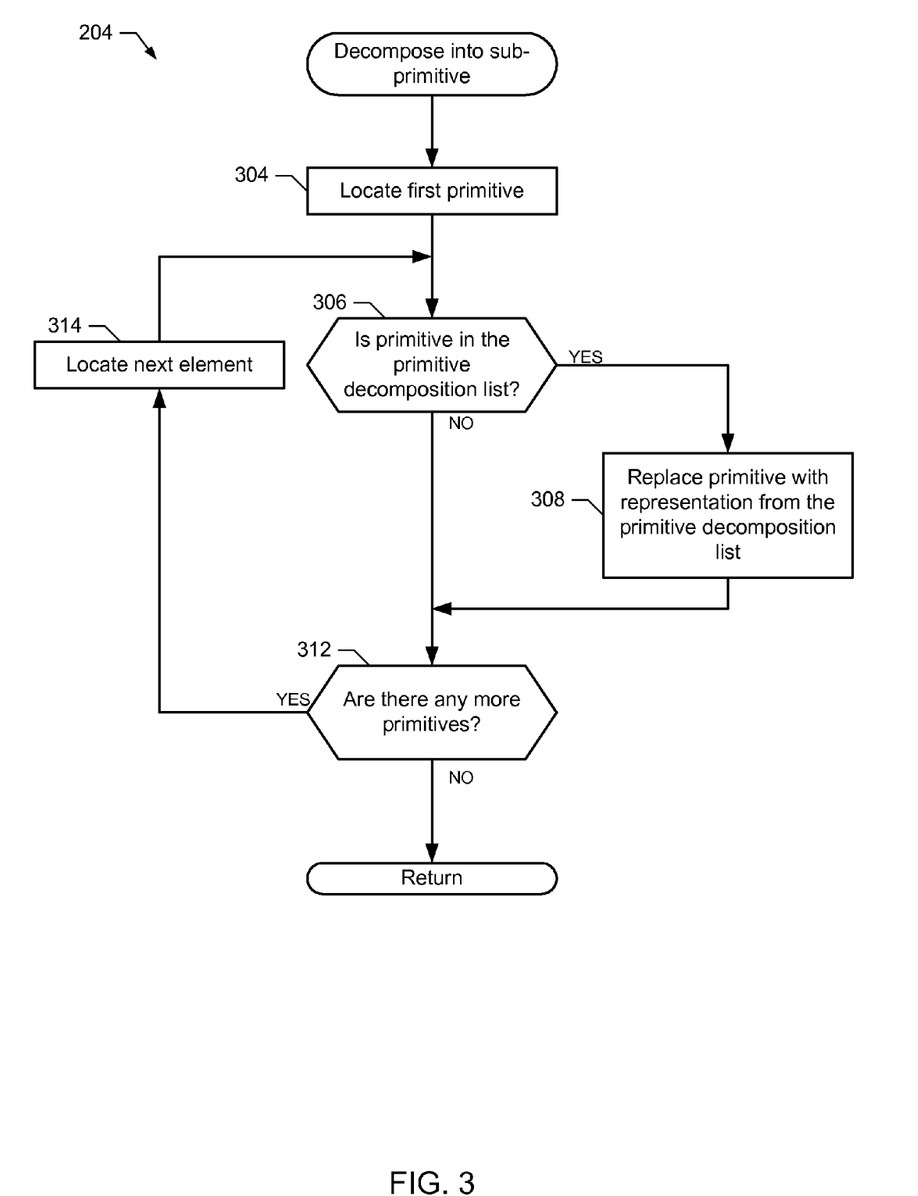
FIG. 3 is a flowchart representative of an example process that may be performed to decompose processes into sub-primitives.

FIG. 3 is a flowchart representative of an example process that may be performed to decompose primitives of a process into sub-primitives (e.g., block 202 of FIG. 2). The example process may be performed by the process decomposer 104 of FIG. 1.

The example process begins when the process decomposer 104 locates the first element or primitive of the process (block 304). For example, the process decomposer 104 may select the first intermediate representation instruction. Alternatively, the process decomposer 104 may analyze the process to look for known patterns (e.g., multiple data additions, repeated computations, etc.) and determine the primitive(s) from the known patterns.

The example process decomposer 104 then determines if the located primitive is in a list of known primitives (block 306). For example, the process decomposer 104 compares the located primitive to the primitive decomposition list 106 to determine if the primitive can be decomposed. If the primitive is not found in the list of known primitives, control proceeds to block 312 to process further primitives.

If the primitive is found in the list of known primitives (block 306), the process decomposer 104 replaces the primitive with the associated decomposition from the list of known primitives (e.g., the primitive decomposition list 106).

The example process decomposer 104 then determines if there are any further primitives to process (block 312). If there are no further primitives (i.e., all input primitive have been processed), the example process of FIG. 3 ends, thereby returning control to the process 200 of FIG. 2. If there are further primitives, the example process decomposer 104 locates the next primitive to be processed (block 314) and control returns to block 306.

FIG. 4 is a flowchart representative of an example process that may be carried out to perform static fusion on sub-primitives (e.g., block 206 of FIG. 2).

The example process of FIG. 4 begins when the static fuser 108 receives sub-primitives (block 402). The example static fuser 108 then selects the first sub-primitive (block 404). The example static fuser 108 next determines if any other of the received sub-primitives is independent of the selected sub-primitive (e.g., sub-primitives associated with multiple processes) (block 406). In other words, the static fuser 108 determines if other sub-primitives can be computed without the results of the selected sub-primitive and vice versa. If there are no other sub-primitives that are independent of the selected sub-primitive, control proceeds to block 412 to select the next sub-primitive for analysis.

If it is determined that there are other sub-primitives that are independent of the selected sub-primitive (block 406), the example static fuser 108 determines if the other sub-primitives can be handled by the same thread as the selected sub-primitive (block 408). For example, the static fuser 108 may determine if the independent sub-primitives are associated with data having similar characteristics to the data associated with the selected sub-primitive. If there are no sub-primitives that can be handled by the same thread as the selected sub-primitive, control proceeds to block 412 to select the next sub-primitive for analysis.

If there are sub-primitives that can be handled by the same thread as the selected sub-primitive (block 408), the static fuser 108 indicates that the sub-primitives should be performed by the same thread (block 410). For example, the static fuser 108 may eliminate all but one thread creation instruction for the two or more sub-primitives.

After determining that there are no sub-primitives to merge (block 408) with the selected sub-primitive or merging the sub-primitives (block 410), the static fuser 108 determines if there are any further sub-primitives to analyze (block 412). If there are no further sub-primitives, the example process 206 completes and control returns to block 208 of FIG. 2. If there are further sub-primitives to analyze, the static fuser 108 selects the next sub-primitive (block 414) and control proceeds to block 406.

Figure 5:
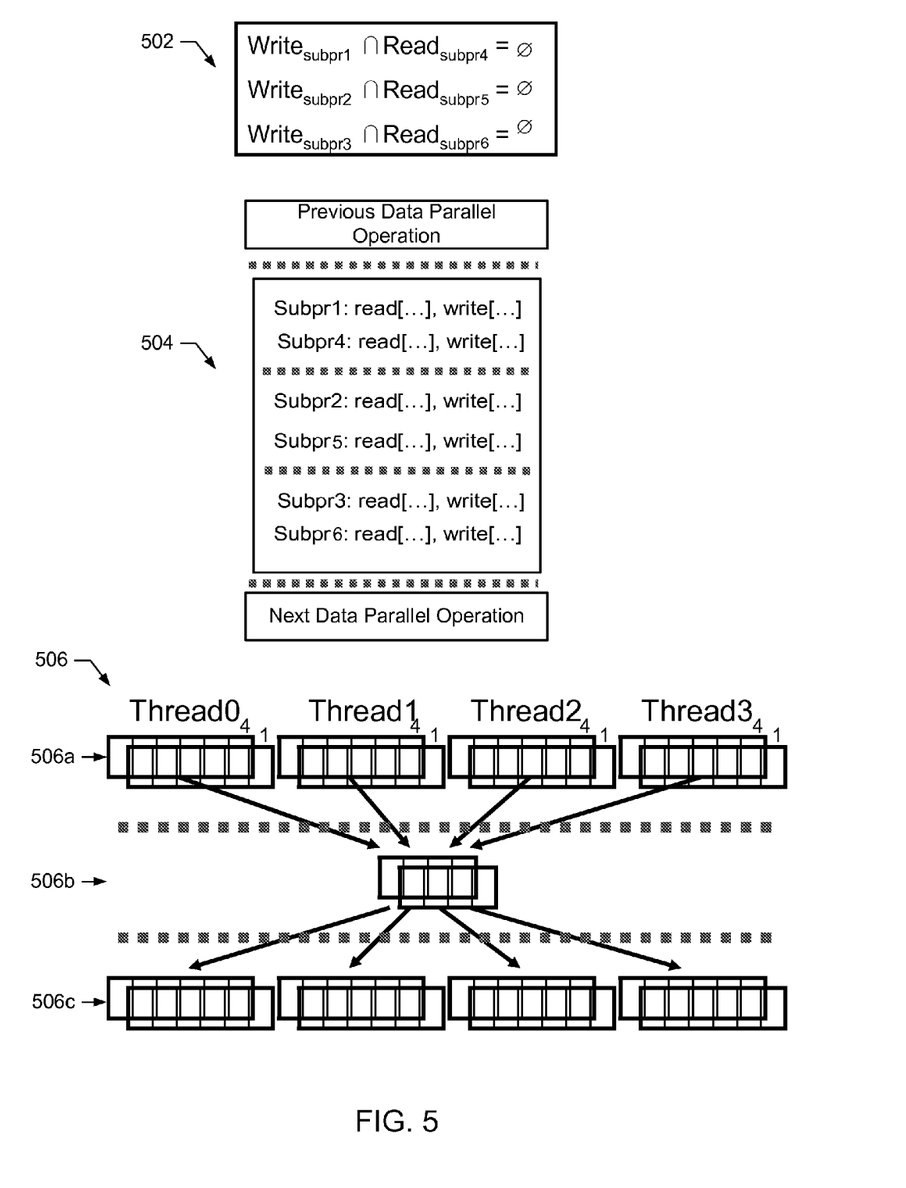
FIG. 5 is an illustration of the execution of an example process that has been statically fused.

FIG. 5 illustrates an example static fusion by the example static fuser 108. In the example of FIG. 5, one or more processes have been decomposed into six sub-primitives. For example, the sub-primitives may be as follows:

| Sub-primitive | Associated Operation |
| --- | --- |
| 1 | r1 = A + B |
| 2 | r2 = r1 + E |
| 3 | r3 = r2 + B |
| 4 | r4 = C + D |
| 5 | r5 = r4 + D |
| 6 | r6 = r5 + F |

The equations of block 502 indicate that sub-primitive 1 and sub-primitive 4 are independent, sub-primitive 2 and sub-primitive 5 are independent, and sub-primitive 3 and sub-primitive 6 are independent. In addition, for purpose of the example it is assumed that sub-primitives 1 and 4, 2, and 5, and 3 and 6 operate on data sets having similar characteristics, respectively.

Accordingly, because of the independence of the sub-primitives, block 504 illustrates that sub-primitive 1 and sub-primitive 4 can be performed together, sub-primitive 2 and sub-primitive 5 can be performed together, and sub-primitive 3 and sub-primitive 6 can be performed together as a part of a single data parallel operation (DP Op). In other words, a single set of threads can be used to process each of the grouped sub-primitives. For example, the grouped threads are fused or merged by the example static fuser 108 of FIG. 1.

Block 506 provides an example of how sub-primitive 1 and sub-primitive 4 can be performed after being fused. Similar processing may be performed for the fusion of sub-primitive 2 and sub-primitive 5 and the fusion of sub-primitive 3 and sub-primitive 6. Block 506 illustrates that the sub-primitives are processed in parallel on four threads (block 506a), the results are combined (block 506b), and the local data is updated with the results of the combination (block 506c). For example, in block 506a the data of sub-primitive 1 is distributed across the four threads and computed (e.g., the data is divided into 4 similarly sized chunks which are each processed by one of the 4 threads). In other words, each thread computes the sum of the assigned chunk of A and the assigned chunk of B. Then, using the same four threads (e.g., no new thread creation required), the data of sub-primitive 4 is distributed across the four threads and computed. In 506b the results of the threaded computation of sub-primitive 1 are combined and the results of the threaded computation of sub-primitive 4 are combined. In other words, the four results from the four threads are added to obtain the result of A+B for sub-primitive 1. Finally, in block 506c the combined results for sub-primitive 1 are distributed back to each thread and the combined results for sub-primitive 4 are distributed back to each thread.

FIG. 6 is a flowchart representative of an example process that may be performed to implement the dynamic fuser 110 of FIG. 1.

The example process begins when the dynamic fuser 110 receives sub-primitives (block 602). The example dynamic fuser 110 then locates the first sub-primitive (block 604). For example, the dynamic fuser 110 may select the first instruction in the received process, may iterate over the lines in the received process, etc. Next, the dynamic fuser 110 removes a barrier or barriers associated with the selected sub-primitive (block 606). Then, the dynamic fuser 110 analyzes the sub-primitive and synchronizes the computation of the sub-primitive to cause dependent computations to delay for the computation of the results on which they are dependent (block 608). For example, if a first thread requires the result of a computation of a second thread, the first thread is signaled to wait for the completion of the second thread.

Then, the dynamic fuser 110 and/or the workload balancer 112 analyzes the number of computations that will be performed by each thread (block 610). As will be shown in the example of FIG. 7, dynamic fusion may result in an uneven distribution of work to each available thread. Then, based on the analysis, the dynamic fuser 110 and/or the workload balancer 112 indicates that threads with fewer computations should receive larger workloads in the next computation (e.g., the next data parallel operation) (block 612).

Then, the dynamic fuser 110 determines if there are further sub-primitives to optimize (block 614). If there are no further sub-primitives to optimize, control returns to block 210 or 212 of FIG. 2. If there are further sub-primitives to analyze, the dynamic fuser 110 locates the next global sub-primitive (block 616) and control proceeds to block 606 of FIG. 6.

FIG. 7 illustrates a prefix-sum operation after example dynamic fusion 700 by the dynamic fuser 110 and/or the workload balancer 112. For example, the process illustrated in FIG. 7 may calculate a prefix-sum of vector A. The prefix-sum primitive may be decomposed into a local sub-primitive and a global sub-primitive by the process decomposer 104.

In block 702, the set of data is distributed across the four threads for computation (local sub-primitive). For example, the elements of vector A may be divided into 4 similarly sized chunks. Each of the four chunks is assigned to one of the threads. Each thread will compute the prefix-sum of the chunk of vector A to which it is assigned.

In block 704, the global sub-primitive is calculated. The barrier between each row of global sub-primitives has been eliminated. Each block of computation only waits for completion of the computations on which it depends. For example, in the prefix-sum example described above, the results of each of the four threads must be added together to obtain the result. In the first row of block 704, thread zero has the result of its computation, thread one computes the sum of the result of the local sub-primitive for thread zero and the local sub-primitive for thread one, thread two computes the sum of the result of thread one and the result of thread two, and thread three computes the sum of the result of thread two and the result of thread three. In the second row of block 704, thread zero has no further work to do for the prefix-sum operation, thread one has the result of its computations, thread two computes the sum of the result of thread one and the result of thread two from the first row of block 704, and thread three computes the sum of the result of thread one from the first row of block 704 and the result of thread three from the first row of block 704. Then, thread one has no further work to do for the prefix-sum operation, thread two has the result of its computations, and thread three has the result of its computations. Therefore, as shown in block 706 the next data parallel operation is assigned to the threads such that thread zero has the largest workload and thread three has the smallest workload. By dynamically fusing and balancing the workload, the threads do not sit idle waiting for other threads, but the threads complete the first and second data parallel operations at similar times.

Figure 8:
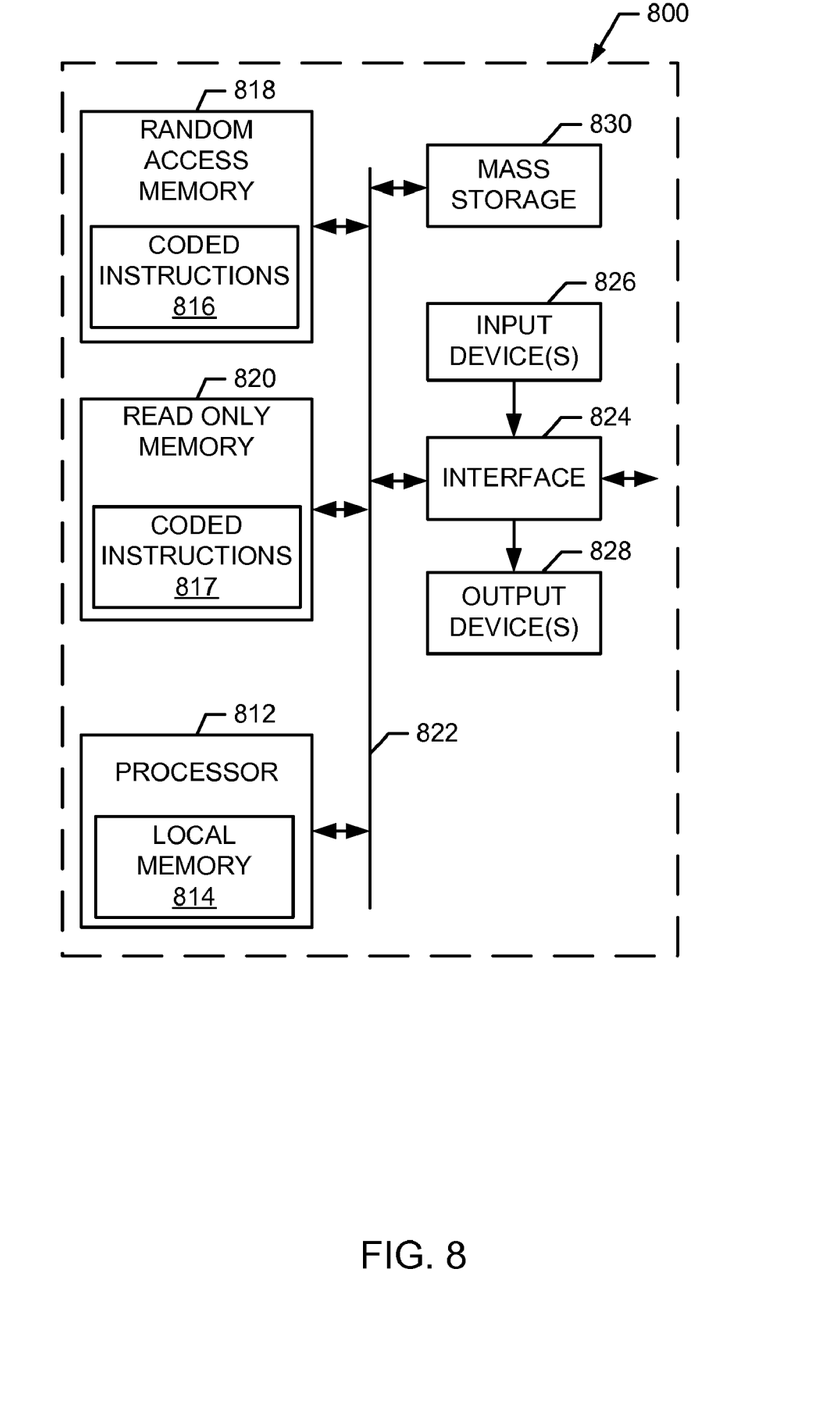
FIG. 8 is a block diagram of an example computer that may execute machine readable instruction to implement the example processes illustrated in FIGS. 2, 3, 4, and 6.

FIG. 8 is a block diagram of an example computer 800 capable of executing the machine readable implementing the processes illustrated in FIGS. 2, 3, 4, and 6 to implement the apparatus and methods disclosed herein.

The system 800 of the instant example includes a processor 812 such as a general purpose programmable processor. The processor 812 includes a local memory 814, and executes coded instructions 816 present in random access memory 818, coded instruction 817 present in the read only memory 820, and/or instructions present in another memory device. The processor 812 may execute, among other things, machine readable instructions that implement the processes illustrated in FIGS. 2, 3, 4, and 6. The processor 812 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 825. The volatile memory 818 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown) in a conventional manner.

The computer 800 also includes a conventional interface circuit 824. The interface circuit 824 may be implemented by any type of well known interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, isopoint and/or a voice recognition system.

One or more output devices 828 are also connected to the interface circuit 824. The output devices 828 can be implemented, for example, by display devices (e.g., a liquid crystal display, a cathode ray tube display (CRT), a printer and/or speakers). The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 800 also includes one or more mass storage devices 830 for storing software and data. Examples of such mass storage devices 830 include floppy disk drives, hard drive disks, compact disk drives and digital versatile disk (DVD) drives.

As an alternative to implementing the methods and/or apparatus described herein in a system such as the device of FIG. 8, the methods and/or apparatus described herein may alternatively be embedded in a structure such as processor and/or an ASIC (application specific integrated circuit).

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   locating a first primitive in a software process;
   decomposing the first primitive into a first set of one or more sub-primitives;
   identifying first and second ones of the sub-primitives as local sub-primitives;
   identifying a third one of the sub-primitives as a global sub-primitive;
   when the first and second local sub-primitives have a characteristic in common, fusing the first and second local sub-primitives to share a first processing thread;
   replacing an execution barrier associated with the global sub-primitive by synchronizing the global sub-primitive with the first processing thread shared by the first and second local sub-primitives; and
   when the replacement of the execution barrier results in the first shared processing thread including a greater number of operations for a first parallel computing event than a second shared processing thread, scheduling the first shared processing thread to receive less operations than the second shared processing in a second data parallel computing event occurring after the first parallel computing event.

2. A method as defined in claim 1, further comprising locating a first sub-primitive decomposition associated with the first primitive in a list of primitive decompositions, wherein the first set of one or more sub-primitives is derived from the first sub-primitive decomposition.

3. A method as defined in claim 2, further comprising locating a second sub-primitive decomposition associated with a second primitive in the list of primitive decompositions, and deriving a second set of one or more sub-primitives from the second sub-primitive decomposition.

4. A method as defined in claim 1, further comprising indicating that the first shared processing thread is to be synchronized with the global sub-primitive when a computation of the global sub-primitive depends on results of a computation from the first shared processing thread.

5. A method as defined in claim 1, wherein the first primitive is one of an element-wise computation, a reduction, a prefix-sum, a data movement computation, a permutation, or sparse matrix vector multiplication.

6. An apparatus comprising:
   a process decomposer to locate a first primitive in a software process, to decompose the first primitive into a first set of one or more sub-primitives, to identify first and second ones of the sub-primitives as local sub-primitives, and to identify a third one of the sub-primitives as a global sub-primitive;
   a static fuser to, when the first and second local sub-primitives have a characteristic in common, fuse the first and second local sub-primitives to share a first processing thread;
   a dynamic fuser to replace an execution barrier associated with the global sub- primitive by synchronizing the global sub-primitive with the first processing thread shared by the first and second local sub-primitives; and a balancer to:
    calculate a first number of operations in the first shared processing thread after the replacement of the execution barrier;
    calculate a second number of operations in a second shared processing thread resulting from the replacement of the execution barrier; and
    when the first number is greater than the second number, schedule the first shared processing thread to receive less operations than the second shared processing thread in a subsequent parallel computation, wherein at least one of the process decomposer, the static fuser, the dynamic fuser, or the balancer is implemented using a tangible processor.

7. An apparatus as defined in claim 6, wherein the process decomposer is to locate a first sub-primitive decomposition associated with the first primitive in a list of primitive decompositions, wherein the first set of one or more sub-primitives is derived from the first sub-primitive decomposition.

8. An apparatus as defined in claim 6, wherein the process decomposer is to locate a second sub-primitive decomposition associated with a second primitive in the list of primitive decompositions, and to derive a second set of one or more sub-primitives from the second sub-primitive decomposition.

9. An apparatus as defined in claim 6, wherein the dynamic fuser is to indicate that the first shared processing thread is to be synchronized with the global sub-primitive when a computation of the global sub-primitive requires depends on of a computation from the first shared processing thread.

10. An apparatus as defined in claim 6, wherein the first primitive is one of an element-wise computation, a reduction, a prefix-sum, a data movement computation, a permutation, or sparse matrix vector multiplication.

11. A tangible storage medium comprising machine readable instruction which, when executed, cause a machine to at least:
    decompose a first primitive in a software process into a first set of one or more sub-primitives;
    identify first and second ones of the sub-primitives as local sub-primitives;
    identify a third one of the sub-primitives as a global sub-primitive;
    when the first local sub-primitive shares a characteristic with the second local sub-primitive, fuse the first and second local sub-primitives to share a first processing thread;
    replace an execution barrier associated with the global sub-primitive by synchronizing the global sub-primitive with the first processing thread shared by the first and second local sub-primitives; and
    when the replacement of the execution barrier results in the first shared processing thread including a greater number of operations for a first parallel computing event than a second shared processing thread, scheduling the first shared processing thread to receive less operations than the second shared processing in a second parallel computing event occurring after the first parallel computing event.

12. A storage medium as defined in claim 11, wherein the instructions further cause the machine to locate a first sub-primitive decomposition associated with the first primitive in a list of primitive decompositions, wherein the first set of one or more sub-primitives is derived from the first sub-primitive decomposition.

13. A storage medium as defined in claim 11, wherein the instructions further cause the machine to locate a second sub-primitive decomposition associated with a second primitive in the list of primitive decompositions, and to derive a second set of one or more sub-primitives from the second sub-primitive decomposition.

14. A storage medium as defined in claim 11, wherein the instructions further cause the machine to indicate that the first shared processing thread is to be synchronized with the global sub-primitive when a computation of the global sub-primitive requires results of a computation from the first shared processing thread.

15. A storage medium as defined in claim 11, wherein the first primitive is one of an element-wise computation, a reduction, a prefix-sum, a data movement computation, a permutation, or sparse matrix vector multiplication.

* * * * *